US012663043B2

(12) United States Patent　　　(10) Patent No.: US 12,663,043 B2

Hiraoka et al.　　　　　　　　　(45) Date of Patent: Jun. 23, 2026

(54) CAGE, ROLLING BEARING, AND METHOD FOR MOLDING CAGE

(71) Applicants: JTEKT CORPORATION, Kariya (JP); FUKUI SEIKI INDUSTRY CO., LTD., Osaka (JP)

(72) Inventors: Hironori Hiraoka, Yao (JP); Takashi Iwata, Kitakatsuragi-gun (JP); Yuya Yamamoto, Osaka (JP); Hiroki Matsuyama, Kitakatsuragi-gun (JP); Ichizo Shimizu, Osaka (JP); Taro Sakaga, Itami (JP); Yuki Kunii, Osaka (JP)

(73) Assignees: JTEKT CORPORATION, Kariya (JP); FUKUI SEIKI INDUSTRY CO., LTD., Osaka (JP)

( * ) Notice: Subject to any disclaimer, the term of this patent is extended or adjusted under 35 U.S.C. 154(b) by 43 days.

(21) Appl. No.: 18/872,989

(22) PCT Filed: Jul. 14, 2022

(86) PCT No.: PCT/JP2022/027704
§ 371 (c)(1),
(2) Date: Dec. 9, 2024

(87) PCT Pub. No.: WO2024/013932
PCT Pub. Date: Jan. 18, 2024

(65) Prior Publication Data

US 2025/0354582 A1　　　Nov. 20, 2025

(51) Int. Cl.
*F16C 19/06*　　　(2006.01)
*F16C 33/38*　　　(2006.01)
(Continued)

(52) U.S. Cl.
CPC .............. *F16C 33/44* (2013.01); *F16C 19/06* (2013.01); *F16C 33/3875* (2013.01);
(Continued)

(58) Field of Classification Search
CPC .. F16C 19/06; F16C 33/3856; F16C 33/3875; F16C 33/44; F16C 2220/04; B29C 45/2616; B29C 2045/0027
See application file for complete search history.

(56) References Cited

U.S. PATENT DOCUMENTS

| 3,743,369 | A | 7/1973 | Langstrom |
| 6,371,655 | B1 | 4/2002 | Fierling |
| (Continued) | | | |

FOREIGN PATENT DOCUMENTS

| JP | S47-014842 B1 | 5/1972 |
| JP | H01-261516 A | 10/1989 |
| (Continued) | | |

OTHER PUBLICATIONS

Oct. 21, 2025 Office Action issud in Japanese Patent Application No. 2024-533440.
(Continued)

*Primary Examiner* — Phillip A Johnson
(74) *Attorney, Agent, or Firm* — Oliff PLC

(57)　　　　ABSTRACT

A cage made of synthetic resin includes an annular body, a plurality of prongs, a plurality of gate marks formed away from each other in a circumferential direction, a weld formed between the gate marks adjacent to each other in the circumferential direction, and a plurality of pocket forming portions that is each disposed between the gate marks and in which pockets are formed. Each of the pocket forming portions has a through hole formed through a bottom of the pocket in an axial direction. The weld is formed between the gate marks only in a region on one circumferential side of
(Continued)

RADIAL DIRECTION

AXIAL DIRECTION the through hole or only in a region on the other circumferential side of the through hole.

5 Claims, 11 Drawing Sheets

(51) Int. Cl.

| | | |
|---|---|---|
| *F16C 33/44* | (2006.01) | |
| *B29C 45/00* | (2006.01) | |
| *B29C 45/26* | (2006.01) | |

(52) U.S. Cl.
CPC .. *B29C 2045/0027* (2013.01); *B29C 45/2616* (2013.01); *F16C 2220/04* (2013.01)

(56) References Cited

U.S. PATENT DOCUMENTS

| | | | |
|---|---|---|---|
| 7,507,028 | B2 | 3/2009 | Markle |
| 11,131,344 | B1 | 9/2021 | Roffe et al. |
| 2012/0051680 | A1 | 3/2012 | Ishikawa et al. |
| 2013/0051717 | A1 | 2/2013 | Duffy et al. |
| 2017/0292567 | A1 | 10/2017 | Taniguchi |
| 2018/0010637 | A1 | 1/2018 | Taniguchi |

FOREIGN PATENT DOCUMENTS

| | | | | | |
|---|---|---|---|---|---|
| JP | 2001-050280 | A | | 2/2001 | |
| JP | 2002-339980 | A | | 11/2002 | |
| JP | 2003-004048 | A | | 1/2003 | |
| JP | 2003035317 | A | * | 2/2003 | .......... F16C 33/6614 |
| JP | 2004-239443 | A | | 8/2004 | |
| JP | 2006-322564 | A | | 11/2006 | |
| JP | 2007-078029 | A | | 3/2007 | |
| JP | 2008064157 | A | * | 3/2008 | .......... F16C 33/3875 |
| JP | 2008064166 | A | * | 3/2008 | .......... F16C 33/3875 |
| JP | 2008-095768 | A | | 4/2008 | |
| JP | 2011-141023 | A | | 7/2011 | |
| JP | 2014-025505 | A | | 2/2014 | |
| JP | 2017-057876 | A | | 3/2017 | |
| JP | 2017-190797 | A | | 10/2017 | |
| JP | 2018-003997 | A | | 1/2018 | |
| JP | 2019-127974 | A | | 8/2019 | |
| JP | 2021-173310 | A | | 11/2021 | |

OTHER PUBLICATIONS

Sep. 13, 2022 International Search Report issued in International Patent Application No. PCT/JP2022/027704.

May 16, 2023 International Search Report issued in International Patent Application No. PCT/JP2023/005105.

Jun. 27, 2023 International Search Report issued in International Patent Application No. PCT/JP2023/014656.

Jun. 27, 2023 International Search Report issued in International Patent Application No. PCT/JP2023/014661.

Jul. 4, 2023 International Search Report issued in International Patent Application No. PCT/JP2023/014664.

Jul. 25, 2023 International Search Report issued in International Patent Application No. PCT/JP2023/016376.

* cited by examiner

RADIAL DIRECTION

AXIAL DIRECTION

FIG. 2

RADIAL DIRECTION

AXIAL DIRECTION (CIRCUMFERENTIAL DIRECTION)

(AXIAL DIRECTION)

(AXIAL DIRECTION)

CAGE, ROLLING BEARING, AND METHOD FOR MOLDING CAGE

TECHNICAL FIELD

The present invention relates to a cage, a rolling bearing, and a method for molding the cage.

BACKGROUND ART

There is a demand that rolling bearings to be used in drive units such as automobile transmissions have reduced axial width dimensions along with downsizing of the drive units. If a cage that holds rolling elements projects in the axial direction beyond the faces of an outer ring and an inner ring by reducing the width dimension of the rolling bearing, the cage may interfere with members other than the rolling bearing and may be damaged during a manufacturing process, packaging, transportation, etc. of the rolling bearing. For this reason, when reducing the width dimension of the rolling bearing, it is necessary that the cage do not project in the axial direction beyond the faces of the outer ring and the inner ring. Therefore, a snap cage made of synthetic resin (see, for example, Patent Document 1) may be used to reduce the width dimension of the rolling bearing.

FIG. 10 is a perspective view showing part of a conventional snap cage 90 made of synthetic resin. FIG. 11 is a sectional view of a rolling bearing 80 including the snap cage 90. As shown in FIGS. 10 and 11, the snap cage 90 includes an annular body 91 and a plurality of prongs 92. The annular body 91 has a circular ring shape. The annular body 91 is disposed on one axial side between an outer ring 81 and an inner ring 82. The plurality of prongs 92 protrudes from the annular body 91 to the other axial side. A pocket 93 is a space surrounded by two adjacent prongs 92 and the annular body 91 between the prongs 92. A rolling element 83 is housed in the pocket 93. In the snap cage 90, an axial thickness t11 of a bottom 91a of the pocket 93 of the annular body 91 is reduced. Since the thickness t11 is small, an axial width dimension W11 of the rolling bearing 80 is smaller than that of a rolling bearing according to the standard dimensional system.

RELATED ART DOCUMENTS

Patent Documents

Patent Document 1: Japanese Unexamined Patent Application Publication No. 2019-127974 (JP 2019-127974 A)

SUMMARY OF THE INVENTION

Problem to be Solved by the Invention

As described above, the axial width dimension W11 of the rolling bearing can be reduced by reducing the thickness t11 of the bottom 91a of the annular body 91 of the snap cage 90. Since the thickness t11 is small, the strength of the snap cage 90 is lower than that of a rolling bearing according to the standard dimensional system. For this reason, there is a limit to the reduction in the thickness of the bottom 91a of the annular body 91.

The present invention is intended to minimize the axial width dimension of a rolling bearing while securing the strength of a cage.

Means for Solving the Problem

A cage of the present invention is made of synthetic resin and includes an annular body and a plurality of prongs spaced away from each other in a circumferential direction of the annular body and protruding from the annular body to one axial side. The cage has a plurality of pockets for holding a plurality of rolling elements of a rolling bearing in a freely rollable manner. Each of the pockets is formed between the prongs adjacent to each other in the circumferential direction. The cage includes a plurality of gate marks formed away from each other in the circumferential direction, a weld formed between the gate marks adjacent to each other in the circumferential direction, and a plurality of pocket forming portions that is each disposed between the gate marks and in which the pockets are formed. Each of the pocket forming portions has a through hole formed through a bottom of the pocket in an axial direction. The weld is formed between the gate marks only in a region on one circumferential side of the through hole or only in a region on another circumferential side of the through hole.

A rolling bearing of the present invention includes an inner ring, an outer ring, a plurality of rolling elements disposed between the inner ring and the outer ring, and the above cage.

A method for molding a cage according to the present invention is a method for molding the above cage using a mold including a plurality of runners, a plurality of gates connected to the runners, and an annular cavity to which the plurality of gates is connected away from each other in the circumferential direction. In the cavity, a plurality of pocket molding spaces in which the pocket forming portions are molded and a plurality of prong molding spaces in which the prong forming portions are molded are formed alternately in the circumferential direction. One of the gates is connected to each of all the prong molding spaces. When molten resin is poured into the cavity from the runners through the gates, a volume of the molten resin poured from one of the two gates adjacent to each other in the circumferential direction is made larger than a volume of the molten resin poured from the other of the two gates.

Effects of the Invention

According to the present invention, it is possible to minimize the axial width dimension of the rolling bearing while securing the strength of the cage.

BRIEF DESCRIPTION OF THE DRAWINGS

FIG. 2 is a perspective view showing a cage of the rolling bearing.

MODES FOR CARRYING OUT THE INVENTION

Figure 1:
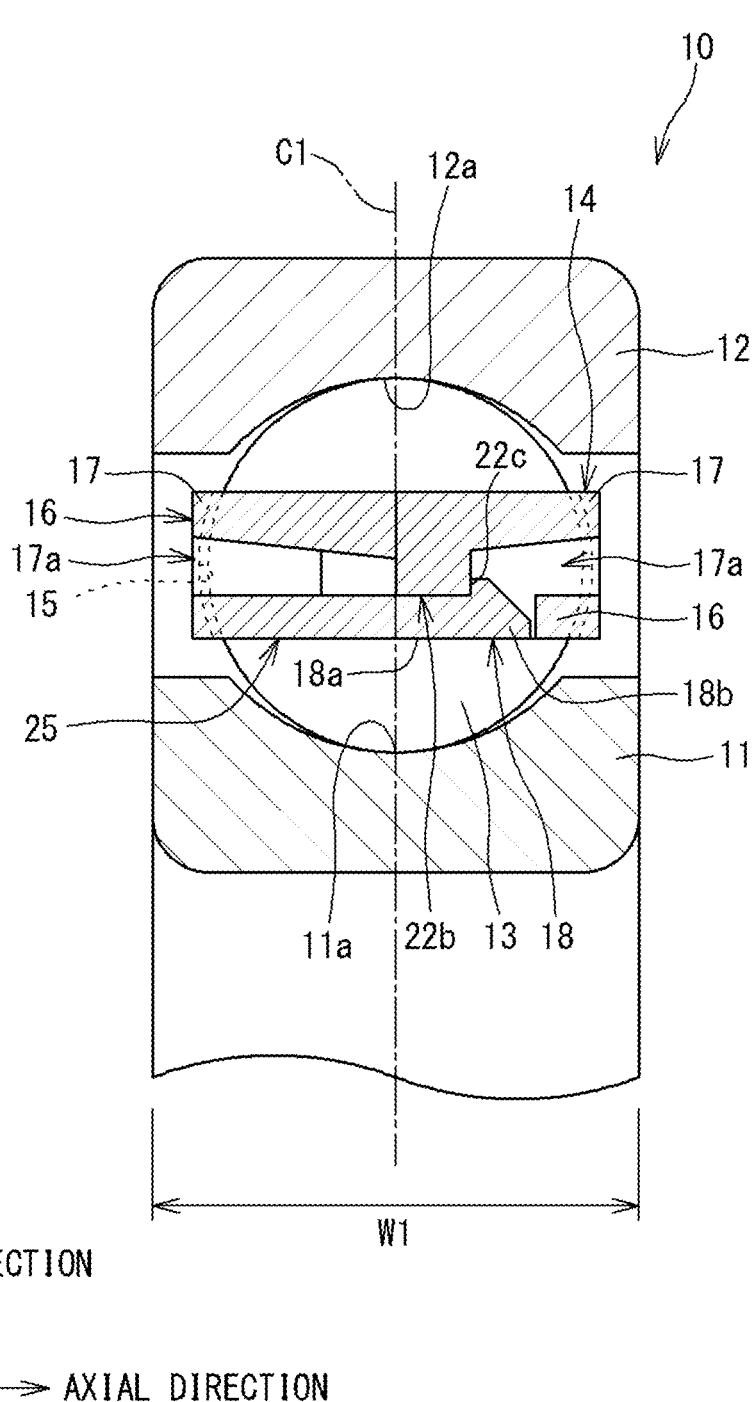
FIG. 1 is a sectional view of a rolling bearing according to an embodiment of the present invention.

First, the contents of an embodiment will be listed and described.

Overview of Embodiment (1) A cage of the embodiment is made of synthetic resin and includes an annular body and a plurality of prongs spaced away from each other in a circumferential direction of the annular body and protruding from the annular body to one axial side. The cage has a plurality of pockets for holding a plurality of rolling elements of a rolling bearing in a freely rollable manner. Each of the pockets is formed between the prongs adjacent to each other in the circumferential direction. The cage includes a plurality of gate marks formed away from each other in the circumferential direction, a weld formed between the gate marks adjacent to each other in the circumferential direction, and a plurality of pocket forming portions that is each disposed between the gate marks and in which the pockets are formed. Each of the pocket forming portions has a through hole formed through a bottom of the pocket in an axial direction. The weld is formed between the gate marks only in a region on one circumferential side of the through hole or only in a region on the other circumferential side of the through hole.

In the above cage, the through hole is formed in the bottom of the pocket in the pocket forming portion. Therefore, the axial thickness at the bottom of the pocket forming portion can be minimized. Thus, the axial width dimension of the rolling bearing can be reduced. The weld is formed between the gate marks adjacent to each other in the circumferential direction only in the region on the one circumferential side or the other circumferential side of the through hole. Therefore, it is possible to suppress the formation of the weld having the lowest strength in a region (stress concentration portion) of the pocket forming portion on a radially outer side or a radially inner side of the through hole when the rolling bearing is in use. Thus, the strength of the cage can be secured even though the through hole is formed in the pocket forming portion.

(2) In the cage according to (1), it is preferable that the weld include a first weld portion extending entirely in a radial direction in an axial view, and a second weld portion extending in the circumferential direction from a radial midpoint of the first weld portion to the through hole in the axial view.

In this case, the strength of the cage can further be increased compared to a case where only the second weld portion is formed to extend entirely in the circumferential direction in the region on the one circumferential side or the other circumferential side of the through hole.

(3) It is preferable that the cage according to (2) further include a plurality of prong forming portions in which the prongs are formed, and one of the gate marks be formed in each of all the prong forming portions.

In this case, when the cage is molded using a mold, molten resin flows into the mold from the gates corresponding to all the prong forming portions. Therefore, the first weld portion and the second weld portion can be easily formed in the region on the one circumferential side or the other circumferential side of the through hole by controlling the volumes of the molten resin poured from the gates.

(4) In the cage according to any one of (1) to (3), it is preferable that a pair of annular components each including the annular body and the plurality of prongs be connected in the axial direction.

In this case, the cage is constituted by the pair of annular components. Therefore, the strength of the cage can further be increased compared to a case where the cage is constituted by only a single annular component and includes cage bars structured by connecting the prongs of the pair of annular components.

(5) A rolling bearing of the embodiment includes an inner ring, an outer ring, a plurality of rolling elements disposed between the inner ring and the outer ring, and the cage according to any one of (1) to (3).

The above rolling bearing provides the same functions and effects as those of the above cage.

(6) A rolling bearing of the embodiment includes an inner ring, an outer ring, a plurality of rolling elements disposed between the inner ring and the outer ring, and the cage according to (4).

The above rolling bearing provides the same functions and effects as those of the above cage.

(7) A method for molding a cage according to the embodiment is a method for molding the cage according to (3) using a mold including a plurality of runners, a plurality of gates connected to the runners, and an annular cavity to which the plurality of gates is connected away from each other in the circumferential direction. In the cavity, a plurality of pocket molding spaces in which the pocket forming portions are molded and a plurality of prong molding spaces in which the prong forming portions are molded are formed alternately in the circumferential direction. One of the gates is connected to each of all the prong molding spaces. When molten resin is poured into the cavity from the runners through the gates, a volume of the molten resin poured from one of the two gates adjacent to each other in the circumferential direction is made larger than a volume of the molten resin poured from the other of the two gates.

In the above method for molding the cage, in the pocket molding space formed between one prong molding space to which one gate is connected and the other prong molding space to which the other gate is connected, the volume of the molten resin poured from the one prong molding space is larger than the volume of the molten resin poured from the other prong molding space. Therefore, the molten resin flowing from the one prong molding space and the molten resin flowing from the other prong molding space join more easily on the one circumferential side or the other circumferential side of the through hole of the pocket forming portion. Thus, the first weld portion and the second weld portion can be formed more easily in the region on the one circumferential side or the other circumferential side of the through hole.

Details of Embodiment

Hereinafter, a preferred embodiment will be described with reference to the drawings.

[Rolling Bearing]

FIG. 1 is a sectional view of a rolling bearing 10 according to the embodiment of the present invention. The rolling bearing 10 includes an inner ring 11, an outer ring 12, a plurality of rolling elements 13, and a cage 14. In the following description, a side closer to an axial center C1 of the rolling bearing 10 may be referred to as an axially inner side, and a side farther from the axial center C1 may be referred to as an axially outer side.

The inner ring 11 has a circular ring shape. The outer ring 12 has a circular ring shape. The outer ring 12 is disposed on a radially outer side of the inner ring 11. The plurality of rolling elements 13 is disposed between the inner ring 11 and the outer ring 12. The rolling elements 13 of the present embodiment are balls. The rolling bearing 10 of the present embodiment is a deep groove ball bearing. The outer peripheral surface of the inner ring 11 has a raceway 11a along which the balls 13 roll. The raceway 11a has a substantially concave arc shape in cross section. The inner peripheral surface of the outer ring 12 has a raceway 12a along which the balls 13 roll. The raceway 12a has a substantially concave arc shape in cross section.

Figure 2:
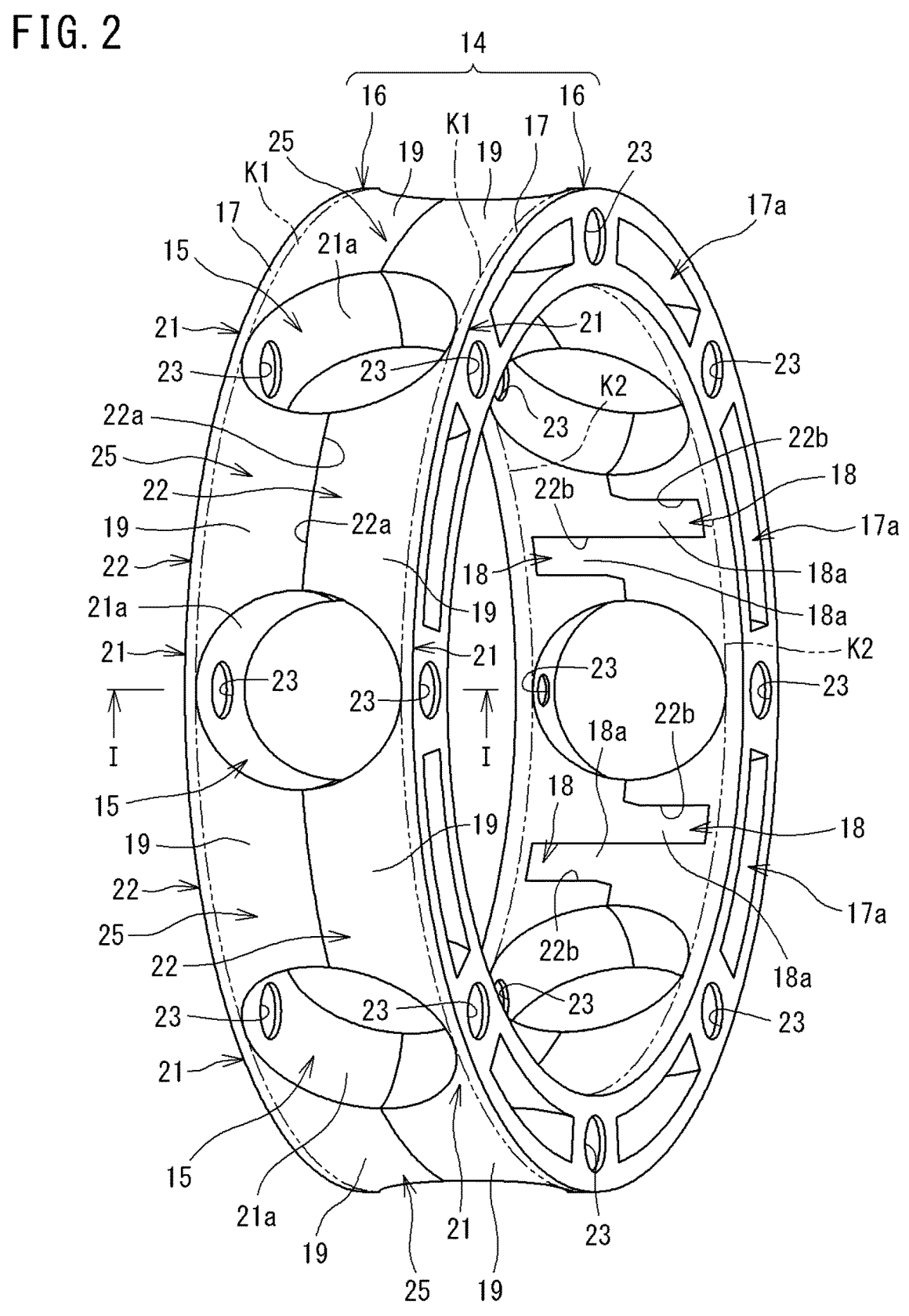

FIG. 2 is a perspective view showing the cage 14 of the rolling bearing 10. As shown in FIGS. 1 and 2, the cage 14 has a plurality of pockets 15. The plurality of pockets 15 holds the plurality of balls 13 in a freely rollable manner. The plurality of pockets 15 is spaced away from each other in a circumferential direction in the cage 14. In a radial view, each pocket 15 has a circular shape. The inner surface of the pocket 15 has a concave shape that is part of a spherical surface. The radius of the concave shape is slightly larger than the radius of the outer peripheral surface of the ball 13 (see FIG. 4 as well).

The cage 14 of the present embodiment is a two-piece cage that holds the balls 13 from both axial sides. The cage 14 is constituted by a pair of annular components 16 joined together in the axial direction. The pair of annular components 16 has the same shape. The pair of annular components 16 is connected in an inverted state. Each annular component 16 is made of synthetic resin. Each annular component 16 is integrally molded by injection molding.

Figure 3:
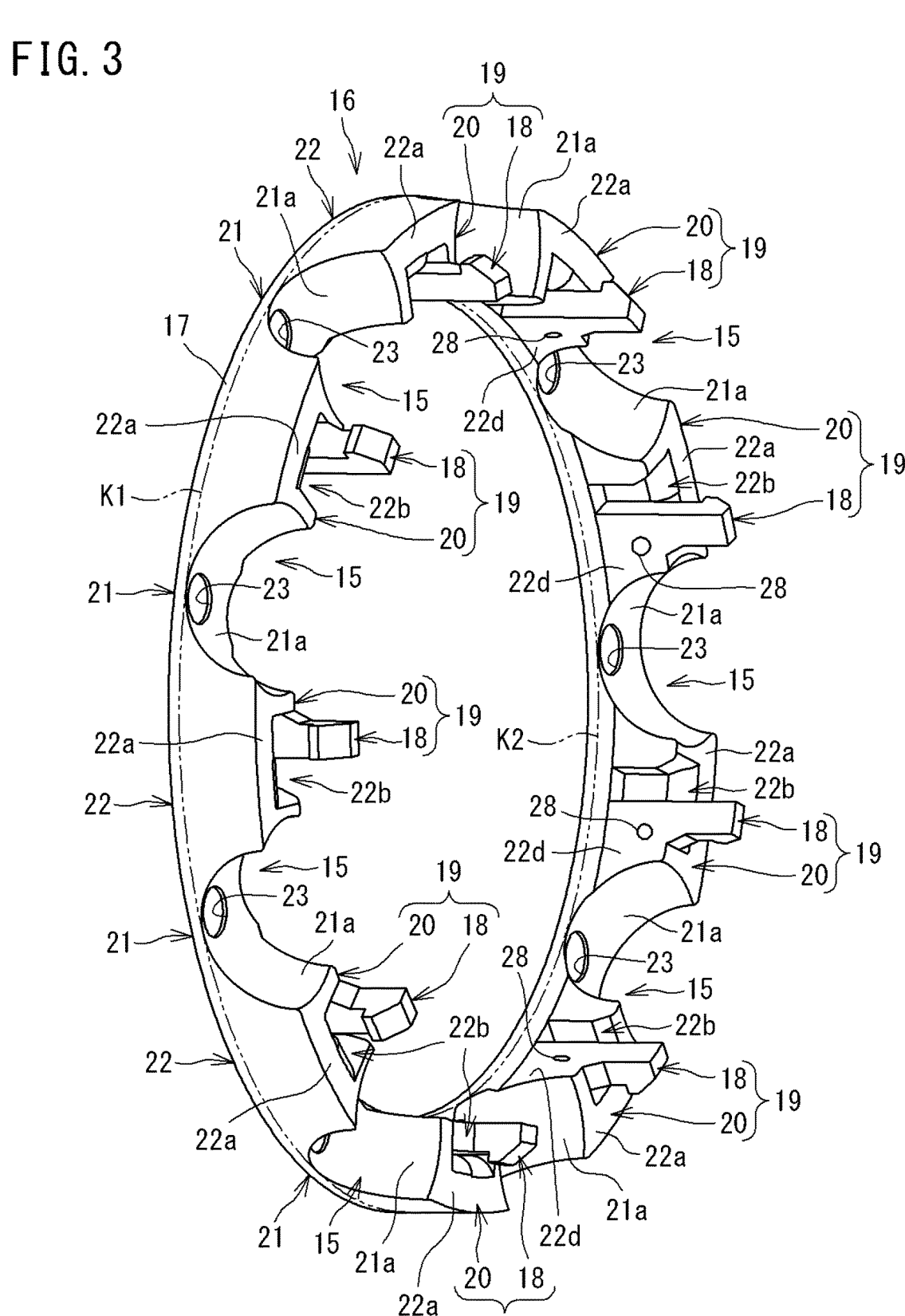
FIG. 3 is a perspective view showing an annular component of the cage.

FIG. 3 is a perspective view showing the annular component 16. As shown in FIGS. 2 and 3, each annular component 16 includes an annular body 17 and a plurality of prongs 19. The annular body 17 has a circular ring shape. The annular body 17 is defined as an axially outer portion of a cylindrical or conical plane connecting a first imaginary circle K1 connecting axially outermost positions of radially outer openings of the pockets 15 and a second imaginary circle K2 connecting axially outermost positions of radially inner openings of the pockets 15. A plurality of back hollow portions 17a is provided away from each other in the circumferential direction. The plurality of back hollow portions 17a is open at the end face of the annular body 17 on the axially outer side and is recessed axially inward into the prongs 19 (see FIG. 1 as well). The plurality of prongs 19 is formed integrally with the annular body 17 and spaced away from each other in the circumferential direction of the annular body 17. The plurality of prongs 19 protrudes from the annular body 17 to the one axial side toward the mating annular component 16. Each prong 19 is a portion (excluding the annular body 17) between adjacent pocket forming portions 21 (described later) in the annular component 16.

The annular component 16 is structured by forming a plurality of pocket forming portions 21 and a plurality of prong forming portions 22 alternately in the circumferential direction. The pocket forming portion 21 is a portion of the annular component 16 where each pocket 15 is formed. The prong forming portion 22 is a portion of the annular component 16 where each prong 19 is formed. The prong forming portion 22 is each prong 19 and a portion of the annular body 17 where the prong 19 is connected. The prong 19 includes a prong body 20 and a prong protrusion 18. The prong protrusion 18 extends axially inward from a tip end face 22a of the prong body 20.

Figure 4:
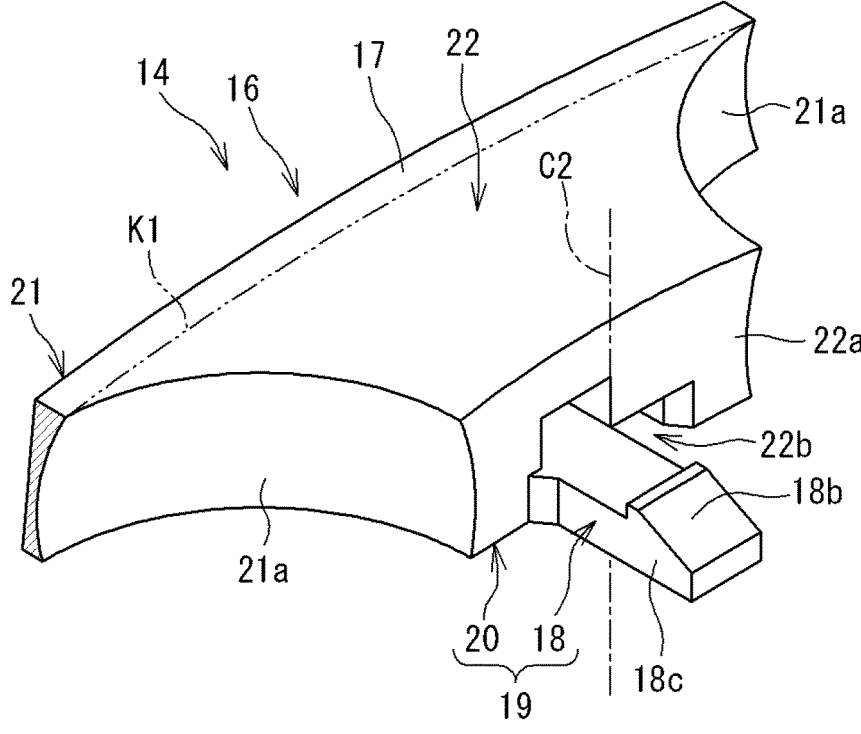
FIG. 4 is a sectional view taken along line I-I in FIG. 2.
Figure 5:
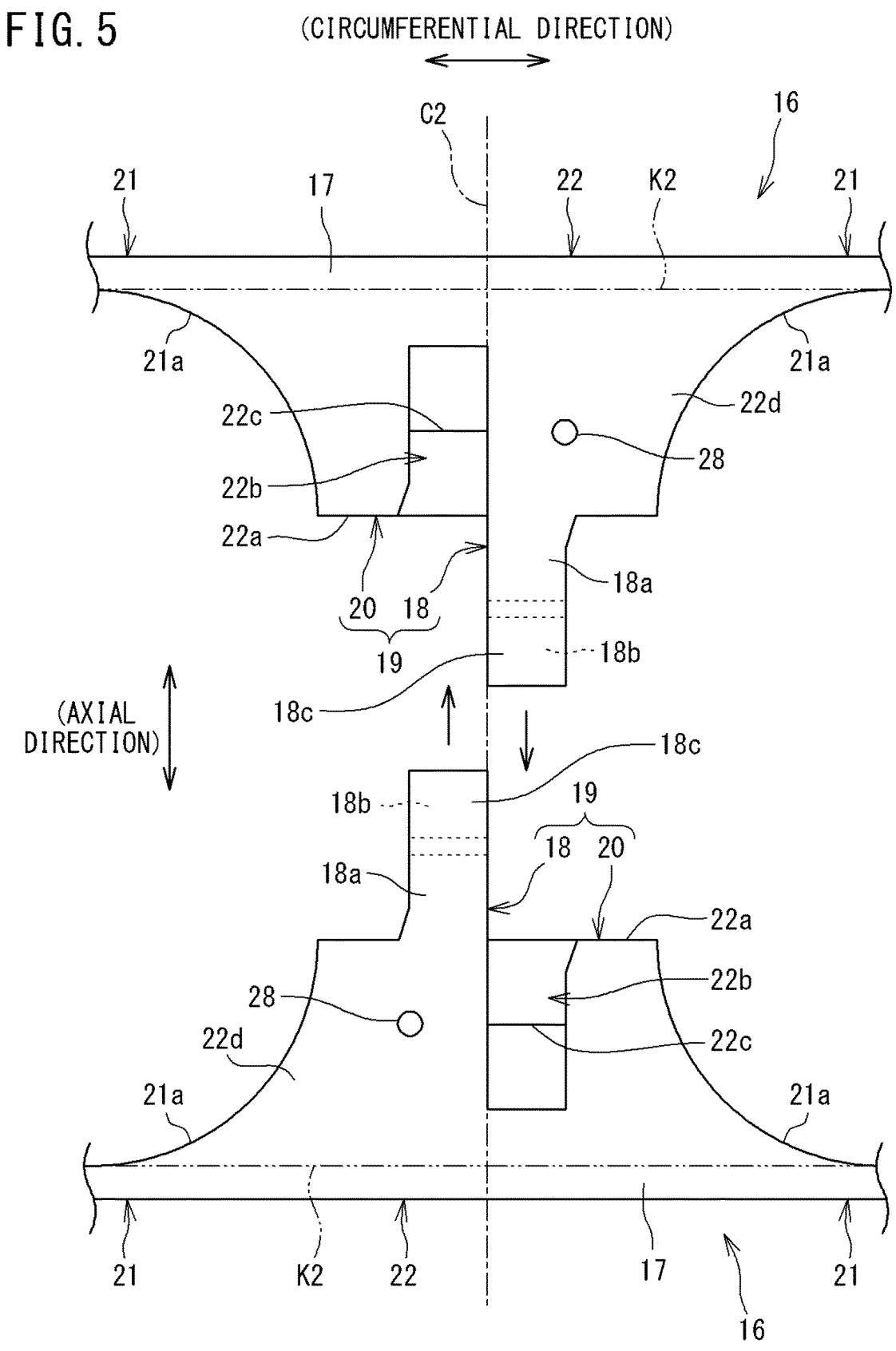
FIG. 5 is a front view of the annular component as viewed from an axially inner side.

FIG. 4 is a perspective view showing part of the annular component 16. FIG. 5 is a diagram of part of a pair of disassembled annular components 16 as viewed from the radially inner side. As shown in FIGS. 4 and 5, the tip end face 22a of each prong body 20 on the axially inner side has a flat shape in the radial view. The tip end face 22a of each prong body 20 comes into contact with the tip end face 22a of each prong body 20 of the mating annular component 16 (see FIG. 2).

The prong protrusion 18 is connected to the tip end face 22a of each prong body 20. The prong protrusion 18 extends in the axial direction toward the mating annular component 16. The prong protrusion 18 is connected to a radially inner portion of the tip end face 22a of the prong body 20, and is connected to a position offset to one circumferential side from a circumferential center C2 of the tip end face 22a of the prong body 20. The prong protrusion 18 has a substantially quadrangular prism shape. A radially inner surface 18a of each prong protrusion 18 constitutes the inner peripheral surface of the annular component 16 (see FIG. 2). The prong protrusion 18 includes a prong protrusion body 18c extending in the axial direction, and a latching projection 18b protruding radially outward at the tip of the prong protrusion body 18c.

The inner peripheral surface of each prong 19 has a latching groove 22b extending in the axial direction. The latching groove 22b is open at the position of the tip end face 22a of the prong body 20. The latching groove 22b is provided at a position offset opposite to the prong protrusion 18 from the circumferential center C2 of the tip end face 22a of the prong body 20. The prong protrusion 18 of the mating annular component 16 is inserted into the latching groove 22b from the tip end face 22a side of the prong body 20. The prong protrusion 18 of the mating annular component 16 is inserted into the latching groove 22b from the latching projection 18b.

As shown in FIG. 1, the latching groove 22b communicates with the back hollow portion 17a that is recessed axially inward from the end face of the annular body 17 on the axially outer side. A radial step surface 22c is formed in the middle of the latching groove 22b in the axial direction. The latching projection 18b is latched in the axial direction to the step surface 22c of the latching groove 22b. The prong protrusion body 18c is housed in the latching groove 22b. Since the latching projection 18b is latched to the step surface 22c, the pair of annular components 16 is not separated in the axial direction. The pair of annular components 16 is connected to each other.

As shown in FIG. 3, every prong forming portion 22 of each annular component 16 has one gate mark 28 (see FIG. 5 as well). The gate mark 28 is a shear mark formed when a gate 46 (described later) of a mold 40 is separated after the annular component 16 has been molded using the mold 40 (described later). In the present embodiment, the gate mark 28 is located at a position offset to one circumferential side (prong protrusion 18 side) of an inner surface 22d of each prong forming portion 22 on the radially inner side. The gate mark 28 has a circular shape.

As described above, a plurality of gate marks 28 is present away from each other in the circumferential direction on the inner peripheral surface of the annular component 16. The pocket forming portion 21 is present between the gate marks 28 adjacent to each other in the circumferential direction. Illustration of the gate marks 28 is omitted in FIG. 2.

As shown in FIGS. 2 and 3, an end face 21a of each pocket forming portion 21 on the axially inner side has a semicircular shape in the radial view. The end face 21a of each pocket forming portion 21 on the axially inner side is part of a spherical surface having a radius slightly larger than the radius of the ball 13. One pocket 15 is formed by disposing the pocket forming portions 21 of the pair of annular components 16 so that they face each other in the axial direction. The one pocket 15 is part of a spherical surface defined by two end faces 21a. The cage 14 includes a plurality of cage bars 25 in the circumferential direction. One cage bar 25 is formed by connecting the prongs 19 of the pair of annular components 16 in the axial direction. Each pocket 15 is formed between the cage bars 25 adjacent to each other in the circumferential direction of the cage 14.

Figure 6:
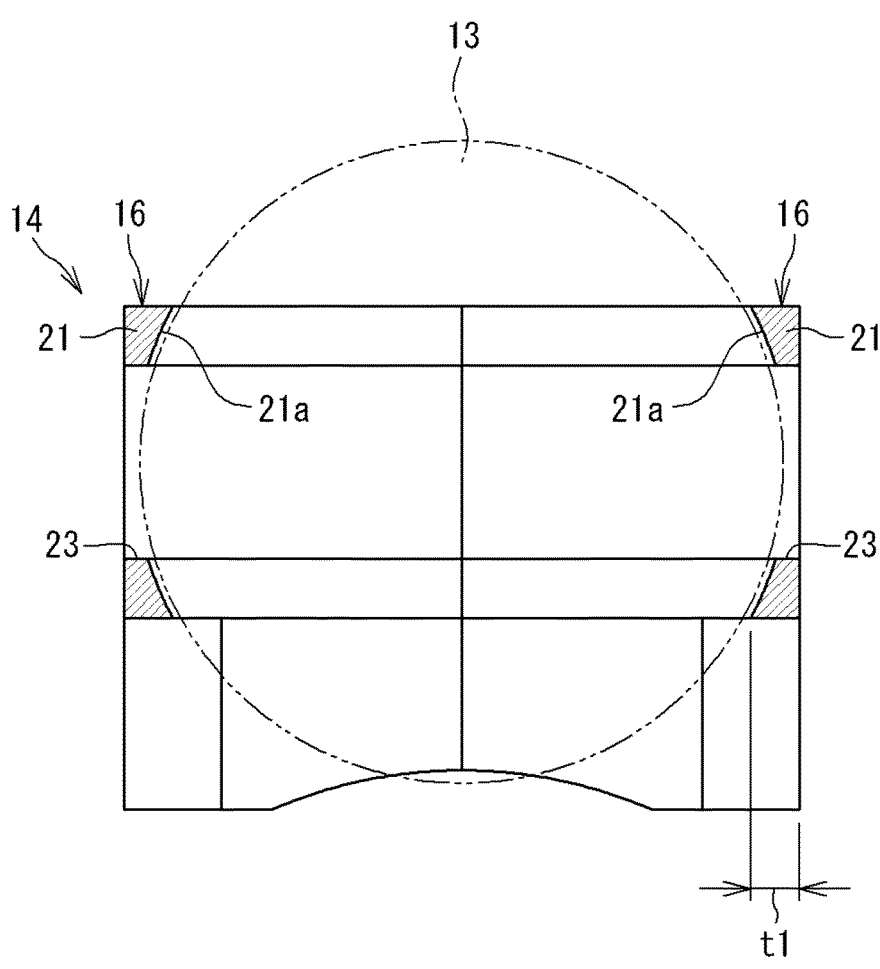
FIG. 6 is a perspective view showing part of the annular components.
Figure 11:
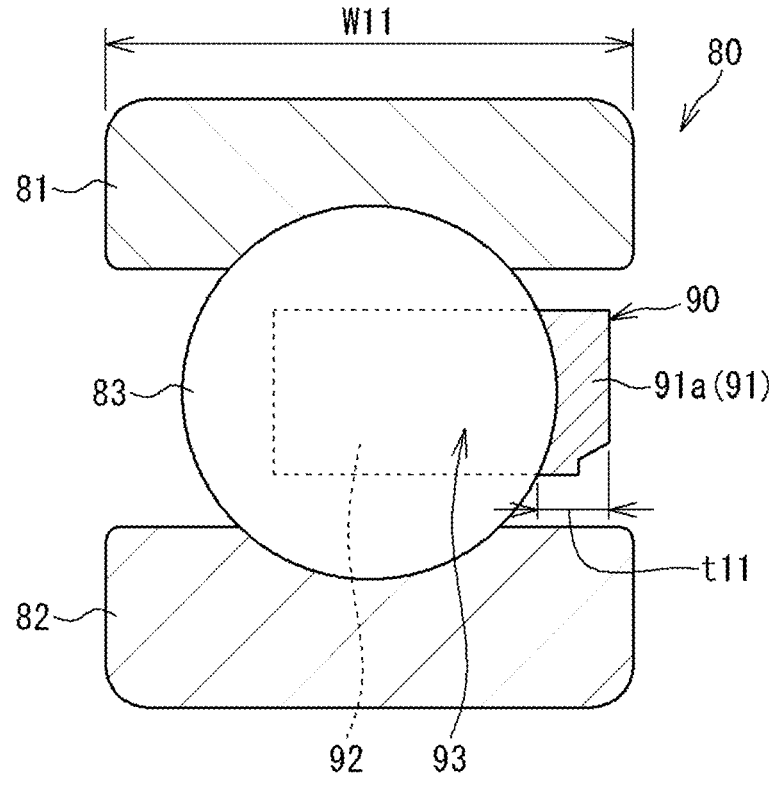
FIG. 11 is a sectional view of a rolling bearing including the conventional snap cage.

FIG. 6 is a sectional view taken along line I-I in FIG. 2. As shown in FIGS. 3 and 6, a circular through hole 23 is open at the bottom of each pocket forming portion 21 that is located at the axially outermost side of the pocket 15. The through hole 23 passes through the annular body 17 in the axial direction. The through hole 23 is open to the end face of the annular body 17 on the axially outer side. By providing the through hole 23, an axial thickness t1 of the bottom of the pocket forming portion 21 can be reduced compared to the thickness t11 (see FIG. 11) of the pocket bottom of the conventional annular body. As a result, an axial width dimension W1 of the rolling bearing 10 (see FIG. 1) is smaller than the width dimension W11 of the conventional rolling bearing (see FIG. 11).

Figure 7:
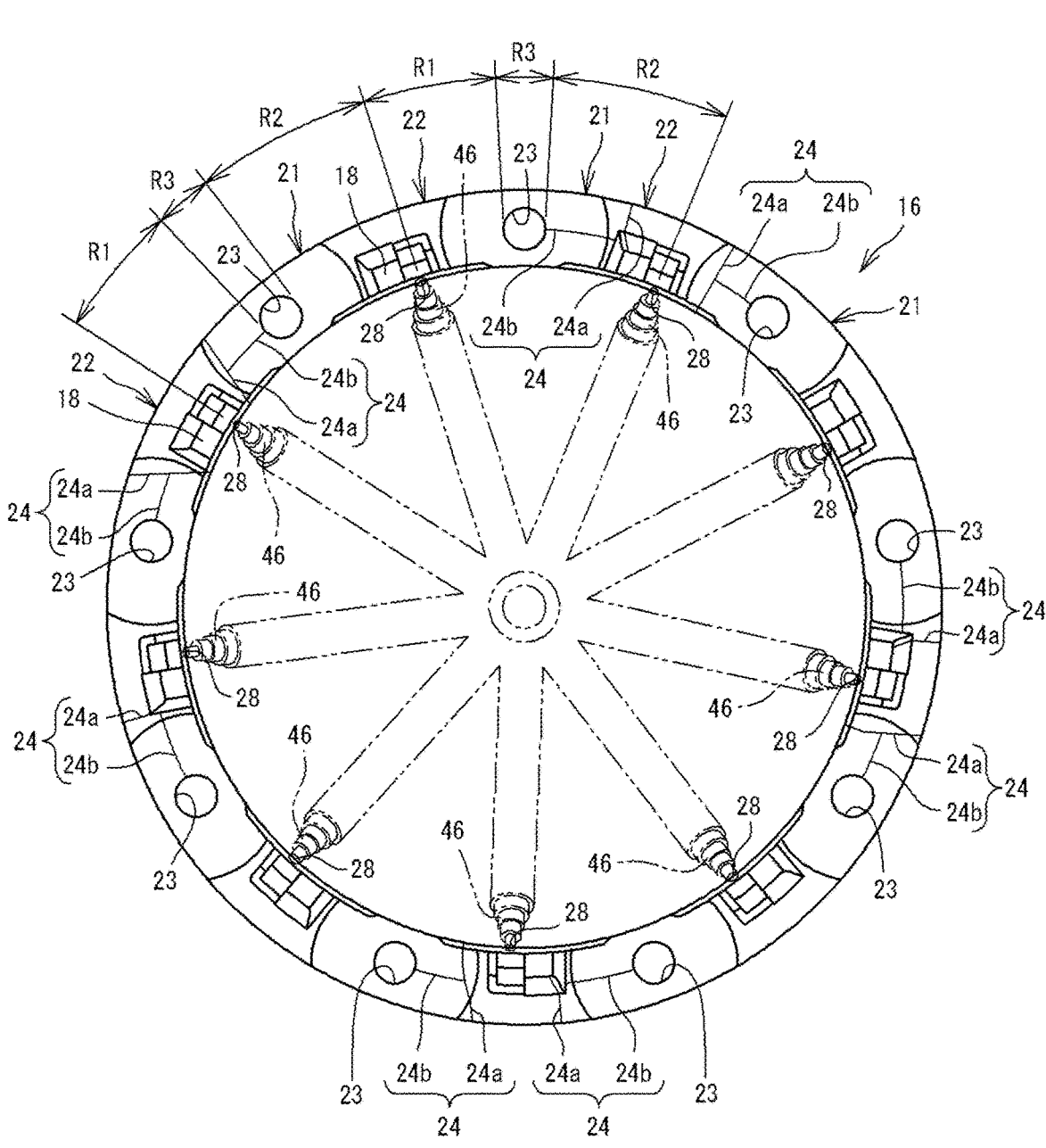
FIG. 7 is a diagram of part of a pair of disassembled annular components as viewed from a radially inner side.

FIG. 7 is a front view of the annular component 16 as viewed from the axially inner side. As shown in FIG. 7, the annular component 16 has a weld (weld line) 24 between the gate marks 28 adjacent to each other in the circumferential direction. The weld 24 is generated when the annular component 16 is molded using the mold 40 (described later). The weld 24 is a thin line generated at a portion where streams of molten resin join and fuse together inside the mold 40 described later.

The weld 24 is formed between the adjacent gate marks 28 only in a region R1 on one circumferential side of the through hole 23 or only in a region R2 on the other circumferential side. The regions R1 and R2 are regions including the prong forming portions 22 and the pocket forming portion 21 excluding a region R3. The region R3 is a region located on the radially outer side and the radially inner side of the through hole 23 in a range in which the through hole 23 is present in the circumferential direction of the prong forming portion 22. The weld 24 is not formed in the region R3 that is a stress concentration portion of each pocket forming portion 21. In the present embodiment, the weld 24 is formed in the pocket forming portion 21 and/or the prong forming portion 22 in the region R1 or the region R2. The weld 24 is formed over the overall thickness of the pocket forming portion 21 in the axial direction (direction perpendicular to the drawing sheet of FIG. 7).

The weld 24 includes a first weld portion 24a and a second weld portion 24b. The first weld portion 24a extends entirely in the radial direction and the axial direction in the region R1 or the region R2 in the axial view (front view in FIG. 7). In the axial view, the second weld portion 24b extends in the circumferential direction and entirely in the axial direction from a radial midpoint (in this case, a central position) of the first weld portion 24a to the through hole 23. Illustration of the welds 24 is omitted in FIGS. 2 and 3.

[Mold]

Figure 8:
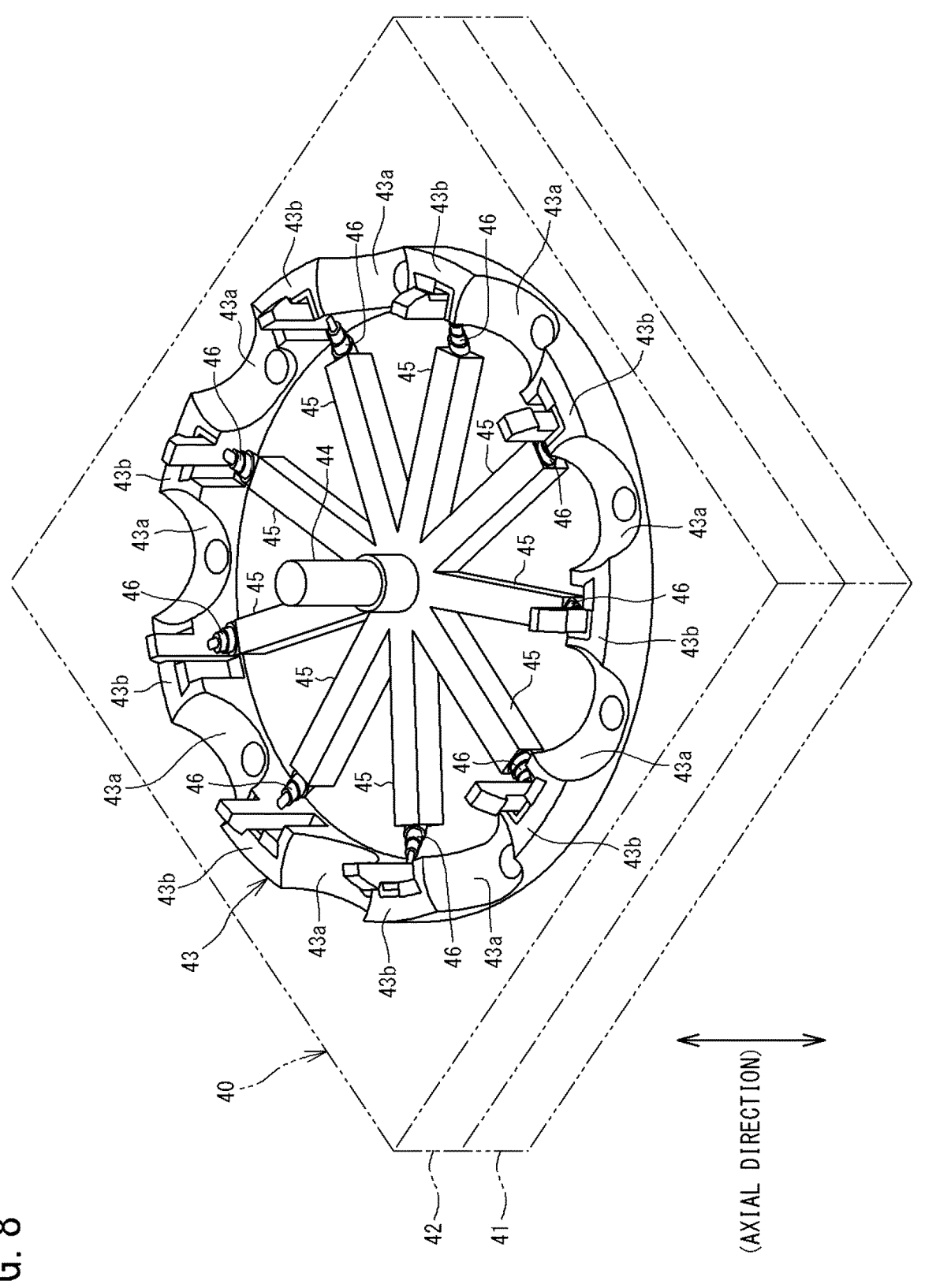
FIG. 8 is a perspective view showing a mold for molding the annular component by injection molding.
Figure 9:
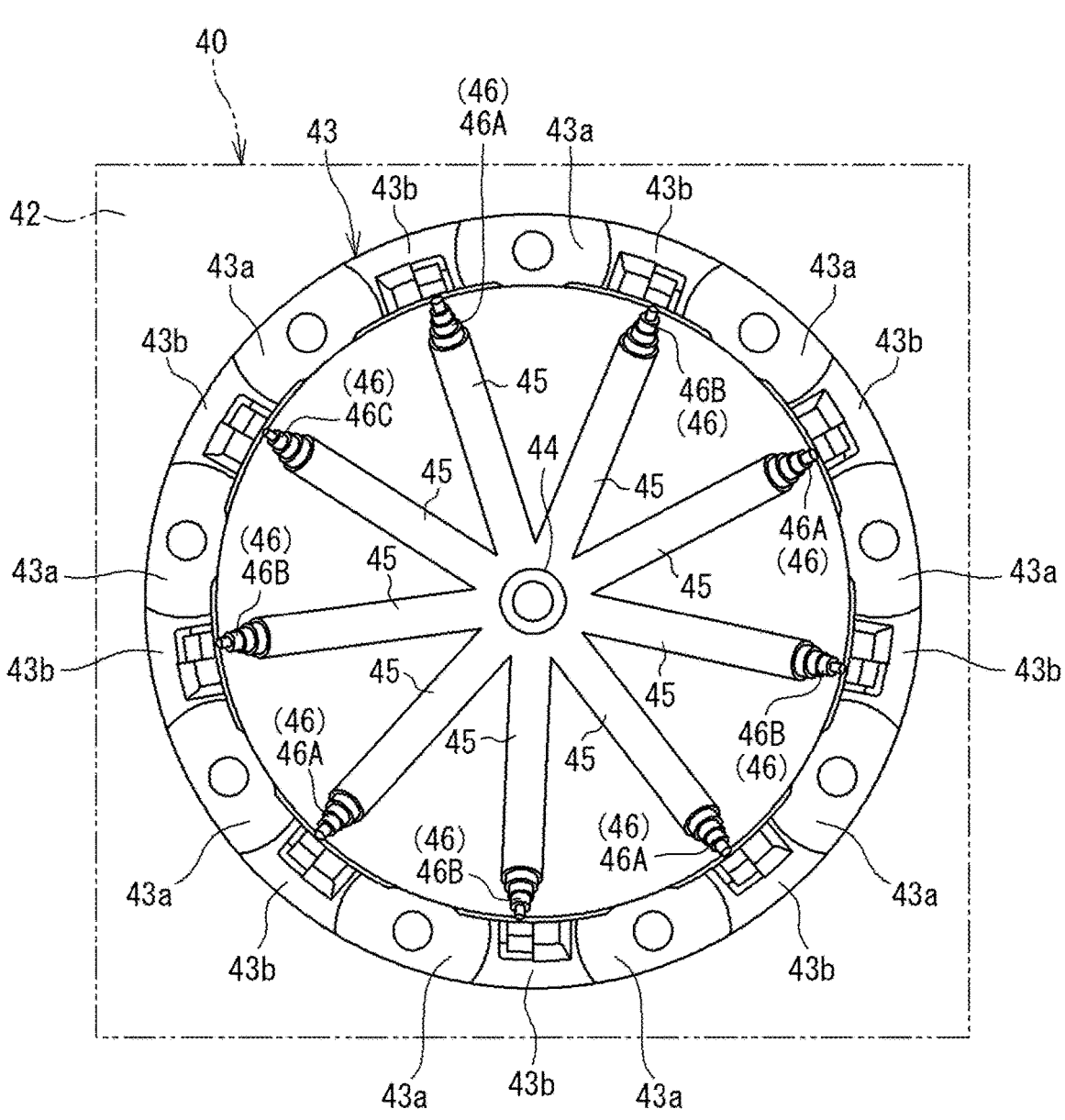
FIG. 9 is a plan view of the mold.
Figure 10:
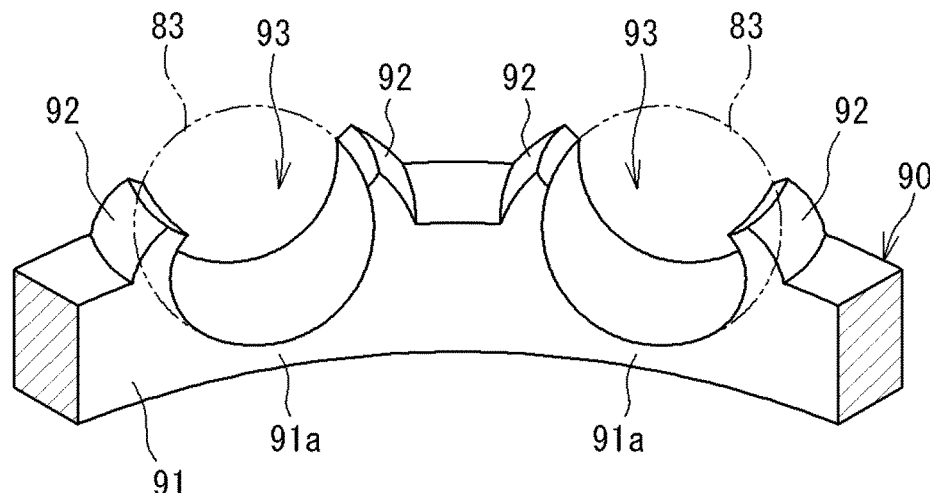
FIG. 10 is a perspective view showing part of a conventional snap cage made of synthetic resin.

FIG. 8 is a perspective view showing the mold 40 for molding the annular component 16 by injection molding. FIG. 9 is a plan view of the mold 40. As shown in FIGS. 8 and 9, the mold 40 includes a first mold portion 41 and a second mold portion 42 that are divided into two pieces in the axial direction of the annular component 16. The first mold portion 41 is a fixed mold. The second mold portion 42 is a movable mold that is movable in the axial direction relative to the first mold portion 41. In FIG. 8, for convenience, the first mold portion 41 and the second mold portion 42 are drawn by imaginary lines (long dashed double-short dashed lines).

The mold 40 further includes a cavity 43, a sprue 44, a plurality of runners 45, and a plurality of gates 46. The cavity 43 is formed between the first mold portion 41 and the second mold portion 42. The cavity 43 is a space to be filled with molten resin. The cavity 43 has an annular shape conforming to the shape of the annular component 16. Therefore, in the cavity 43, a plurality of pocket molding spaces 43a in which the pocket forming portions 21 are molded and a plurality of prong molding spaces 43b in which the prong forming portions 22 are molded are formed alternately in the circumferential direction. Although illustration is omitted, cylindrical molding columns for molding the through holes 23 are provided in the first mold portion 41 or the second mold portion 42 at positions corresponding to the through holes 23 in the pocket molding spaces 43a.

The sprue 44, the plurality of runners 45, and the plurality of gates 46 are passages for supplying molten resin to the cavity 43. The sprue 44 is a passage formed in the second mold portion 42. The sprue 44 extends in the axial direction at the center of the annular cavity 43. The sprue 44 of the present embodiment has a circular shape in cross section.

The runner 45 is a passage formed between the first mold portion 41 and the second mold portion 42. One runner 45 is provided for one prong forming portion 22. The plurality of runners 45 extends radially outward from the tip of the sprue 44. Each runner 45 of the present embodiment has a quadrangular shape in cross section.

The plurality of gates 46 is connected to the radially outer ends of the runners 45. Each gate 46 extends to the radially outer side and the one axial side (upper side in FIG. 8) from the radially outer end of each runner 45. Each gate 46 of the present embodiment has a circular shape in cross section, and is formed so that the diameter gradually decreases toward the tip.

The tips of the plurality of gates 46 are connected away from each other in the circumferential direction of the cavity 43. Specifically, the tip of each gate 46 is connected in each prong molding space 43b at a position offset to one circumferential side (prong protrusion 18 side) of the location corresponding to the inner surface 22d of the prong forming portion 22. Thus, the gates 46 are connected to all the prong molding spaces 43b.

The method for molding the annular component 16 is as follows. Molten resin supplied to the sprue 44 of the mold 40 sequentially passes through each runner 45 and each gate 46, and flows into each prong molding space 43b of the cavity 43. The molten resin that has flowed into each prong molding space 43b flows into the adjacent pocket molding spaces 43a. The molten resin then fills the entire cavity 43. The molten resin is cured and the cured resin is taken out of the mold 40 as the annular component 16.

As shown in FIG. 9, the plurality of gates 46 of the present embodiment includes a plurality of first gates 46A, a plurality of second gates 46B, and one third gate 46C. The diameter at the position where the tip of the first gate 46A is open to the cavity 43, the diameter at the position where the tip of the second gate 46B is open to the cavity 43, and the diameter at the position where the tip of the third gate 46C is open to the cavity 43 are different from each other. Four first gates 46A and four second gates 46B are provided. One third gate 46C is provided. The diameter of the tip of the first gate 46A is larger than the diameter of the tip of the second gate 46B. The diameter of the tip of the second gate 46B is larger than the diameter of the tip of the third gate 46C.

The first gate 46A and the second gate 46B are disposed to adjoin each other in the circumferential direction. The third gate 46C is disposed between the first gate 46A and the second gate 46B at a predetermined location in the circumferential direction (substantially a 10 o'clock position in FIG. 9). Therefore, the diameters of the tips of two gates 46 adjacent to each other in the circumferential direction are different from each other. Thus, the volumetric flow rate of molten resin flowing from one of the adjacent gates 46 having a larger tip diameter into the prong molding space 43b is higher than the volumetric flow rate of molten resin flowing from the other gate 46 having a smaller tip diameter into the prong molding space 43b.

The volumetric flow rate of the molten resin flowing through the first gate 46A is higher than the volumetric flow rate of the molten resin flowing through the second gate 46B. The volumetric flow rate of the molten resin flowing through the first gate 46A is higher than the volumetric flow rate of the molten resin flowing through the third gate 46C. The volumetric flow rate of the molten resin flowing through the second gate 46B is higher than the volumetric flow rate of the molten resin flowing through the third gate 46C.

The molten resin flowing through the first gate 46A flows from the first gate 46A to one side in the circumferential direction of the cavity 43 and to the other side in the circumferential direction of the cavity 43. The molten resin flowing through the second gate 46B flows from the second gate 46B to one side in the circumferential direction of the cavity 43 and to the other side in the circumferential direction of the cavity 43. The molten resin flowing through the third gate 46C flows from the third gate 46C to one side in the circumferential direction of the cavity 43 and to the other side in the circumferential direction of the cavity 43. Regarding the first gate 46A and the second gate 46B adjacent to each other, the volume of the molten resin flowing from the first gate 46A to the one side in the circumferential direction of the cavity 43 can be made different from the volume of the molten resin flowing from the second gate 46B to the other side in the circumferential direction of the cavity 43. Regarding the first gate 46A and the second gate 46B adjacent to each other, the volume of the molten resin flowing from the first gate 46A to the other side in the circumferential direction of the cavity 43 can be made different from the volume of the molten resin flowing from the second gate 46B to the one side in the circumferential direction of the cavity 43. Regarding the first gate 46A and the third gate 46C adjacent to each other, the volume of the molten resin flowing from the first gate 46A to the one side in the circumferential direction of the cavity 43 can be made different from the volume of the molten resin flowing from the third gate 46C to the other side in the circumferential direction of the cavity 43. Regarding the second gate 46B and the third gate 46C adjacent to each other, the volume of the molten resin flowing from the second gate 46B to the other side in the circumferential direction of the cavity 43 can be made different from the volume of the molten resin flowing from the third gate 46C to the one side in the circumferential direction of the cavity 43. By combining the tip diameter and disposition of the first gate 46A, the tip diameter and disposition of the second gate 46B, and the tip diameter and disposition of the third gate 46C, the streams of molten resin can join at a position other than the circumferential center between adjacent gates 46.

As described above, as shown in FIG. 7, in the molded annular component 16, the weld 24 is formed in the pocket forming portion 21 in the region R1 on the one circumferential side of each through hole 23 or in the region R2 on the other circumferential side of each through hole 23. The second weld portion 24b of the weld 24 is a thin line generated at a portion where the streams of molten resin that have passed from one of the prong molding spaces 43b through the radially outer side and the radially inner side of the through hole 23 join and fuse together. The first weld portion 24a of the weld 24 is a thin line generated at a portion where the streams of molten resin that have passed through the radially outer side and the radially inner side of the through hole 23 and the stream of molten resin from the other of the prong molding spaces 43b join and fuse together.

[Functions and Effects of Embodiment]

As described above, in the cage 14 of the present embodiment, the through holes are formed in the bottoms of the pockets 15 in the pocket forming portions 21. Therefore, the axial thickness t1 at the bottoms of the pocket forming portions 21 can be reduced. Thus, in the rolling bearing 10 using the cage 14 of the present embodiment, the axial width dimension W1 of the rolling bearing 10 can be reduced. The weld 24 is formed between the gate marks 28 adjacent to each other in the circumferential direction only in the region R1 on the one circumferential side of the through hole 23 or only in the region R2 on the other circumferential side. Therefore, in the cage 14 of the present embodiment, it is possible to suppress the formation of the weld having the lowest strength in the region R3 that is a stress concentration portion of the pocket forming portion 21 when the rolling bearing 10 is in use. Thus, the cage 14 of the present embodiment has strength even though it has the through hole 23 in the pocket forming portion 21.

The weld 24 includes the first weld portion 24a extending entirely in the radial direction in the axial view, and the second weld portion 24b extending in the circumferential direction from the radial midpoint of the first weld portion 24a to the through hole 23 in the axial view. Therefore, in the cage 14 of the present embodiment, it is possible to further increase the strength of the cage 14 compared to a case where only the second weld portion 24b is formed to extend entirely in the circumferential direction of the region R1.

All the prong forming portions 22 of the cage 14 of the present embodiment have the gate marks 28. That is, when the cage 14 of the present embodiment is molded using the mold 40, molten resin flows into the mold 40 from the gates 46 corresponding to all the prong forming portions 22. Therefore, the first weld portion 24a and the second weld portion 24b can be easily formed in the region R1 or the region R2 instead of the region R3 by controlling the volumes of the molten resin poured from the gates 46.

The cage 14 of the present embodiment is structured by connecting the pair of annular components 16 in the axial direction. Therefore, in the cage 14 of the present embodiment, it is possible to further increase the strength of the cage 14 compared to a snap cage structured by only a single annular component.

Two gates 46 of the mold 40 adjacent to each other in the circumferential direction have different diameters at their tips. Therefore, the volume of molten resin flowing from one of the two gates 46 adjacent to each other in the circumferential direction into the cavity 43 on the one side in the circumferential direction is larger than the volume of molten resin flowing from the other gate 46 into the cavity 43 on the other side in the circumferential direction. As a result, the first weld portion 24*a* and the second weld portion 24*b* can be formed more easily in the region R1 or the region R2 instead of the region R3 by controlling the volumes of the molten resin poured from the gates 46.

[Others]

The embodiment disclosed above is illustrative in all respects and not restrictive. For example, the rolling bearing 10 may be an angular contact ball bearing other than the deep groove ball bearing. The cage 14 may be a snap cage or a prong type cage in addition to the two-piece cage. The weld 24 may be formed in the pocket forming portion 21 or in the prong forming portion 22 in the region R1 or the region R2.

The gate 46 of the mold 40 is connected in each prong molding space 43*b* at the location corresponding to the inner surface 22*d* of the prong forming portion 22, but is not limited to this. For example, the gate 46 may be connected in each prong molding space 43*b* at a location corresponding to the prong protrusion 18. In this case, it is understood that the gate mark 28 is formed on the prong protrusion 18 of the molded cage 14.

The number of gates 46 is not limited to that in the present embodiment. When there is an even number of gates 46, these gates 46 may be composed of two types of gate having different tip diameters. Two gates 46 of the mold 40 adjacent to each other in the circumferential direction have different diameters at their tips in order to vary the volumetric flow rates of the molten resin, but this is not limitative. For example, two gates 46 adjacent to each other in the circumferential direction may be connected to independent flow paths, and the inflow pressures of the molten resin to the gates 46 may be made different from each other.

DESCRIPTION OF THE REFERENCE
NUMERALS

10 . . . rolling bearing, 11 . . . inner ring, 12 . . . outer ring, 13 . . . ball (rolling element), 14 . . . cage, 15 . . . pocket, 16 . . . annular component, 17 . . . annular body, 18 . . . prong protrusion, 19 . . . prong, 20 . . . prong body, 21 . . . pocket forming portion, 22 . . . prong forming portion, 23 . . . through hole, 24 . . . weld, 24*a* . . . first weld portion, 24*b* . . . second weld portion, 25 . . . cage bar, 28 . . . gate mark, 40 . . . mold, 43 . . . cavity, 43*a* . . . pocket molding space, 43*b* . . . prong molding space, 45 . . . runner, 46 . . . gate, R1 . . . region, R2 . . . region, R3 . . . region

The invention claimed is:

1. A cage made of synthetic resin and including an annular body and a plurality of prongs spaced away from each other in a circumferential direction of the annular body and protruding from the annular body to one axial side, the cage having a plurality of pockets for holding a plurality of rolling elements of a rolling bearing in a freely rollable manner, each of the pockets being formed between the prongs adjacent to each other in the circumferential direction, the cage comprising:

a plurality of gate marks formed away from each other in the circumferential direction;

a weld formed between the gate marks adjacent to each other in the circumferential direction; and a plurality of pocket forming portions that is each disposed between the gate marks and in which the pockets are formed, wherein each of the pocket forming portions has a through hole formed through a bottom of the pocket forming portions in an axial direction, the weld is formed between the gate marks only in a region on one circumferential side of the through hole or only in a region on another circumferential side of the through hole, and the weld includes:

a first weld portion extending entirely in a radial direction in an axial view; and a second weld portion extending in the circumferential direction from a radial midpoint of the first weld portion to the through hole in the axial view.

2. The cage according to claim 1, further comprising a plurality of prong forming portions in which the prongs are formed, wherein one of the gate marks is formed in each of all the prong forming portions.

3. A method for molding the cage according to claim 2 using a mold including a plurality of runners, a plurality of gates connected to the runners, and an annular cavity to which the plurality of gates is connected away from each other in the circumferential direction, wherein in the cavity, a plurality of pocket molding spaces in which the pocket forming portions are molded and a plurality of prong molding spaces in which the prong forming portions are molded are formed alternately in the circumferential direction, one of the gates is connected to each of all the prong molding spaces, and when molten resin is poured into the cavity from the runners through the gates, a volume of the molten resin poured from one of the two gates adjacent to each other in the circumferential direction is made larger than a volume of the molten resin poured from the other of the two gates.

4. The cage according to claim 1, wherein:

a pair of annular components each including the annular body and the plurality of prongs is connected in the axial direction; and the cage includes cage bars structured by connecting the prongs of the pair of annular components.

5. A rolling bearing comprising an inner ring, an outer ring, a plurality of rolling elements disposed between the inner ring and the outer ring, and the cage according to claim 1.

* * * * *